US006262985B1

(12) United States Patent
Huang et al.

(10) Patent No.: US 6,262,985 B1
(45) Date of Patent: Jul. 17, 2001

(54) METHOD AND APPARATUS FOR FULL RANGE TRANSLATION OF LARGE EXTERNAL IDENTIFIER TO SMALL INTERNAL IDENTIFIER

(75) Inventors: Tony Huang, Novato, CA (US); John Edward Vincent, Ottawa (CA); James Leslie Watchorn, Nepean (CA); Paul Fong-Yan Hung, Stittsville (CA); Osama Bahgat, Petaluma, CA (US); Gary Depelteau, Ottawa; James McLaughlin, Nepean, both of (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/050,129

(22) Filed: Mar. 30, 1998

(51) Int. Cl.$^7$ .................................................. H04L 12/50
(52) U.S. Cl. ......................... 370/397; 370/399; 370/409
(58) Field of Search .................................. 370/392, 379, 370/382, 383, 395, 389, 397, 394, 409, 399, 465, 475

(56) References Cited

U.S. PATENT DOCUMENTS

| | | | | |
|---|---|---|---|---|
| 5,323,389 | * | 6/1994 | Bitz et al. | 370/60.1 |
| 5,546,387 | * | 8/1996 | Larsson et al. | 370/60 |
| 5,887,000 | * | 3/1999 | Adachi et al. | 370/20.1 |
| 5,936,959 | * | 8/1999 | Joffe | 370/397 |
| 6,029,212 | * | 2/2000 | Kessler et al. | 710/52 |
| 6,044,166 | * | 3/2000 | Bassman et al. | 382/103 |

* cited by examiner

Primary Examiner—Ricky Ngo
Assistant Examiner—Phuc Tran

(57) ABSTRACT

Methods and apparatus are described for translating identifiers that are used by computers to reference various entities such as data structures, external objects, or connections in a telecommunications network, from a bulkier less manageable format to a smaller more manageable format. Such translations are carried out to reduce the needless processing and memory demands that are made of a localized set of components when the large identifiers the set receives from other components include fields that none of the members of the set need to access. The invention is centerd around a two-stage look-up method wherein an inputted external identifier is divided into two parts. The first part of the inputted external identifier is used as an address into a first look-up table that contains base-addresses of a second look-up table. The second part of the inputted external identifier is used as an offset-address into the second look-up table. The offset-address and the base-address are combined to access the second look-up table, which contains all the internal identifiers. The invention can be easily scaled to handle a larger range of external identifiers, and a larger number of internal identifiers. The invention operates at a fast and predictable speed. Use of the invention also leads to a significant savings in memory costs.

35 Claims, 3 Drawing Sheets

| Mask_Cnt | f(Mask_Cnt) |
|---|---|
| 0001 | 0000000000000001 |
| 0010 | 0000000000000011 |
| 0011 | 0000000000000111 |
| 0100 | 0000000000001111 |
| 0110 | 0000000000011111 |
| 0111 | 0000000000111111 |
| 1000 | 0000000001111111 |
| 1001 | 0000000011111111 |
| 1010 | 0000000111111111 |
| 1011 | 0000001111111111 |
| 1100 | 0000011111111111 |
| 1101 | 0000111111111111 |
| 1110 | 0001111111111111 |
| 1110 | 0011111111111111 |
| 1111 | 0111111111111111 |
| 0000 | 1111111111111111 |

FIG. 2

METHOD AND APPARATUS FOR FULL RANGE TRANSLATION OF LARGE EXTERNAL IDENTIFIER TO SMALL INTERNAL IDENTIFIER

FIELD OF THE INVENTION

This invention relates to the fields of computer science and telecommunications and, more specifically, to means and methods of translating identification strings from one format into another.

BACKGROUND OF THE INVENTION

Many computing applications manipulate identification strings that reference various entities such as data structures, external objects and processes. Such identification strings, which are hereinafter referred to as identifiers, tend to be large so that they can be distinguished from a great number of other identifiers. Identifiers also tend to be large in order for the schemes that organize them to be more flexible and more able to accommodate future additions of new identifiers.

One common type of manipulation effected by such computing applications involves translating identifiers from a bulkier less manageable format to a smaller more manageable format that can be manipulated more easily. Such translations are performed to reduce the needless processing and memory demands that are made of a localized set of components, when the identifiers they are handling include fields that they do not need to access.

One example of a computing application that requires such translations arises in the field of telecommunications engineering, and more specifically in the operation of an Asynchronous Transfer Mode (ATM) switch. In an ATM network, the external connection identifier (ECI) of a cell, which can be processed by all nodes of the network, can comprise a Virtual Path Identifier (VPI), and a Virtual Channel Identifier (VCI). These identifiers, when considered in combination, can occupy binary words that are typically at least 28 bits long, and thus can assume billions of possible values. Usually however, it is not feasible or necessary for a switch to support such a large number of connections at one time primarily because of the vast amounts of context memory and processing resources required for each connection. As a result, a smaller number of connections is supported instead.

Accordingly, it is desirable to implement a system in ATM networks for translating a set of ECIs that can be manipulated by any of the switches into smaller more easily manageable internal connection identifiers (ICIs) that will only have to be manipulated by a single switch. At the same time, it is also desirable that the set of ECIs selected for translation comprise any subset of the full range of possible ECIs. That is, assuming the full range of ECIs comprises M ECIs, it is desirable that a switch capable of translating N ECIs into ICIs, be able to set each of its N ECIs to any one of the M possible ECIs.

Whether the target application is the above-described ATM network, or any other application wherein large bulky identifiers need to be converted into smaller, more manageable internal identifiers, present systems that translate identifiers have shortcomings.

Systems designed around direct one-stage look-up tables, wherein each table-entry is addressed by a large, external identifier and contains a smaller internal identifier, are economically impractical. This is because under such an approach, the size of the look-up tables must be set to equal the number of ECIs comprising the full range of external identifiers. For example, if an individual ATM switch can serve 100,000 connections, and the full range of ECIs extends from 0 to 1,000,000, the size of the look-up table would have to be 1,000,000 entries rather than 100,000 entries. Such large look-up tables are costly and wasteful.

Systems designed around constrained one-stage look-up tables cannot translate the full range of possible external identifiers, and thus are also undesirable.

Systems that use hashing functions to access look-up tables are complex, and may require expensive hardware to implement. Moreover, the time required to complete each translation may not be deterministic.

Systems designed around Content Addressable Memory (CAMs), wherein each entry is addressed by an internal identifier and contains an external identifier, are expensive. Furthermore, at present, a reasonably priced CAM does not have sufficient capacity to hold the number of internal identifiers required by many applications.

An improved system is thus desired for translating identifiers from a bulkier less manageable external format that can be manipulated by a broader range of components comprising a computing application, to a smaller more manageable internal format that can be more efficiently manipulated by a narrower range of those same components.

The desired system should also be able to translate any of the full range of external identifiers.

Another object of such a system is to achieve the translations using a simple and robust design that requires a minimal amount of memory and computation.

It is also desirable that the translation system exhibit fast and deterministic response-times.

SUMMARY OF THE INVENTION

These and other objects are achieved using a system designed around a two stage look-up method. More specifically, the objects are achieved by a method of translating any of a full range of external identifiers into a smaller internal identifier, the method making use of a final look-up table (LUT) that has an internal identifier in each of its entries, that is divided into a plurality of pages, and that allows access to a given entry upon receiving a base-address that specifies the page of the entry and an offset-address that specifies the position of the entry within the page, said method comprising the steps of: dividing an inputted external identifier into a plurality of fields; inputting the contents of a subset of the plurality of fields, the subset being associated with the internal identifiers inside a specific page of the final LUT, as a given address into an initial look-up table (LUT) that has in each of its entries a base-address of a page of the final LUT, to obtain the base-address of the specific page; adding the base-address of the specific page obtained from the inputting step to an offset-address, which is obtained from the contents of the field or fields of the external identifier not sent into the initial LUT, to obtain a resulting sum, and using the resulting sum as an address into the final LUT; and reading the entry of the final LUT referenced by the resulting sum to obtain the smaller internal identifier.

Another aspect of this invention is centred around a method of translating any of a full range of external identifiers into a smaller internal identifier, said method comprising the steps of: dividing an inputted external identifier into a plurality of fields; inputting the contents of a subset of the plurality of fields as an address into an initial look-up table (LUT), the initial LUT having in each of its entries a base-value; and adding the base-value obtained from the inputting step to an offset-value which is obtained from the contents of the field or fields of the external identifier not sent into the initial LUT, to obtain the internal identifier.

In yet another aspect of this invention, the aforementioned objects are achieved by an apparatus for translating any of a full range of external identifiers, each of which is defined by a plurality of fields, into a smaller internal identifier, comprising: a final look-up table (LUT) which is divided into a plurality of pages, each page having one entry or many entries and each entry containing an internal identifier, which receives an address input that comprises a base-address specifying a specific page and an offset-address specifying a specific entry within the specific page, and which yields an output that includes the internal identifier stored inside the specific entry; an initial look-up table (LUT) which has a plurality of entries, each entry containing a respective base-address of a page of the final LUT, which receives an address input comprising a subset of the fields of the external identifier, said address input being associated with the internal identifiers inside a specific page of the final LUT, and which yields an output that includes a specific base-address found in the entry referenced by the address input; and an adder, which receives a first input comprising the specific base-address yielded as output by the initial LUT, which receives a second input comprising an offset-address obtained from the field or fields of the external identifier that were not used as addressing inputs into the initial LUT, and which yields as an output the address input into the final LUT.

BRIEF DESCRIPTION OF THE DRAWINGS

Embodiments of the invention will now be disclosed with reference to the accompanying drawings, in which:

FIG. 2 is a table that illustrates the mask values generated by the possible inputs into a mask-count decoder shown in FIG. 1.

DETAILED DESCRIPTION OF THE PREFERRED EMBODIMENTS

Figure 1:
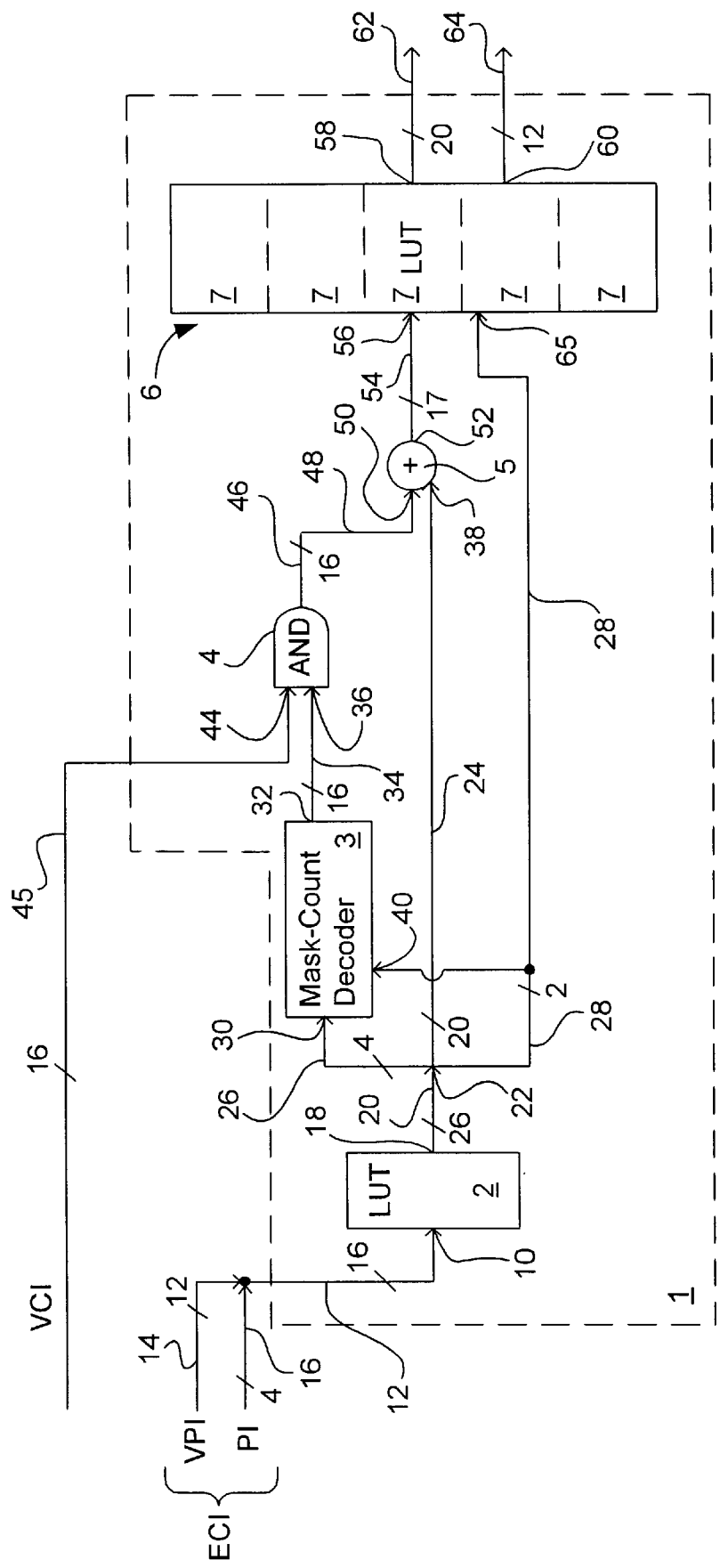
FIG. 1 is a block diagram of an external to internal identifier translator for deployment within an Asynchronous Transfer Mode (ATM) switch according to a preferred embodiment of this invention.

FIG. 1 illustrates a circuit 1 for translating an external connection identifier (ECI) associated with an ingress cell on an Asynchronous Transfer Mode (ATM) switch, to a smaller more manageable internal connection identifier (ICI), according to a preferred embodiment of this invention. The input of the circuit is the ECI, which comprises a 12-bit Virtual Path Identifier (VPI) that enters through a VPI-line 14, and a 16-bit Virtual Channel Identifier (VCI) that enters through a VCI-line 45. A 4-bit port identifier (PI) that enters through a PI-line 16 is also assumed to be part of the ECI for the purposes of this description, though the PI is generated internally by the switch in order to distinguish between flows of cells that belong to the same VPI/VCI combination but enter the switch on different ports. In another variant of this invention, the PI need not be inputted into the circuit 1. The outputs of the circuit are the ICI, which leaves through a 20-bit wide ICI-line 62, and a series of control flags which leaves through a 12-bit wide flags-line 64. Reduced-size ICIs can be used to refer to connections inside the switch because only a small subset of all possible ECIs needs to be present for processing purposes on any one switch.

The circuit 1 comprises a 64K×32-bit look-up table (LUT) 2, a mask-count decoder 3, an AND gate 4, an adder 5 and a 128K×32-bit LUT 6. More specifically, the LUT 2 has an input interface 10 that receives data from a 16 bit wide line 12 that is arranged to interconnect with the 12 bit wide VPI-line 14 and the 4 bit wide PI-line 16. The LUT 2 has an output interface 18 that leads into a line 20, the line 20 being at least 26 bits wide.

The line 20 is connected to a junction 22 where it is split into three parallel branches, a first one being a 20-bit wide line 24, the second being a 4-bit wide line 26, and the third being a 2-bit wide line 28. The line 24 is connected to a first data input interface 38 of the adder 5. The line 26 is connected to a data input interface 30 of the mask-count decoder 3. The line 28 is connected to a control input interface 40 of the mask-count decoder and additionally, an output-enable input interface 65 of the LUT 6.

An output interface 32 of the mask-count decoder 3 is connected by a 16-bit wide line 34 to a first data input interface 36 of the AND gate 4. A second data input interface 44 of the AND gate 4 receives data from the 16-bit wide VCI-line 45. It is to be noted that the AND gate 4 is actually a bank of N two-input bit-wise AND gates, where N is the number of bits flowing through each of the lines 34 and 45. N is equal to 16 in a preferred embodiment. The output interface 46 of the AND gate 4 is connected via a 16-bit wide line 48 to a second data input interface 50 of the adder 5.

The adder 5 has an output interface 52 which is connected to a 17 bit wide line 54 to an address input interface 56 of the LUT 6. The LUT 6 has two output interfaces 58 and 60 connected, respectively, to the 20-bit wide ICI-line 62 and the 12-bit wide flag-line 64.

The LUTs 2,6 are central to the operation of the circuit 1. The LUT 6 maps input information from other parts of the circuit 1 to the ICIs that can be issued by the circuit 1. More specifically, each entry of the LUT 6 contains an ICI that is mapped from a single PI/VPI/VCI combination, such a combination constituting a single ECI as mentioned before. The entries of the LUT 6 are grouped into several variably sized pages 7, each page 7 containing all the ICIs of a single PI/VPI combination, and each ICI within a given page 7 corresponding to a different VCI in the PI/VPI combination associated with the given page. Only ECIs that are provisioned to be served by the switch can map their PI/VPI values to a page 7 and their VCI value to an entry within a page 7. ECIs that are not provisioned to be served by the switch do not have their PI/VPI values mapped to a page 7, nor their VCI value mapped to an entry within the LUT 6.

The LUT 2 maps PI/VPI combinations to base-addresses of the pages 7 in the LUT 6. More specifically, each entry of the LUT 2 is addressed by a PI/VPI combination. LUT 2 addresses exist for the full range of PI/VPI values. If a given PI/VPI combination has its own page 7 on the LUT 6, then its corresponding entry in the LUT 2 contains a pointer into the base-address of that page 7. If a given PI/VPI combination does not have its own page 7 in the LUT 6, then a connection type field in its LUT 2 entry indicates that the connection is invalid.

As described in greater detail below, the following basic steps are required to generate a single, unique ICI from a given PI/VPI/VCI combination:

i) The given VPI/PI combination is fed into the LUT 2 to obtain a base-address of an associated page in the LUT 6;

ii) The VCI is fed into the circuit 1 to obtain an offset-address within the page obtained in step (i);

iii) The base-address obtained in step (i) is added to the offset-address obtained in step (ii), to obtain the address of an entry of the LUT 6 that contains the single ICI.

iv) The ICI in the entry referenced by the address obtained in step (iii) is read-out of the LUT 6 as output.

These steps are described in greater detail below.

The operation of the circuit 1 begins whenever an ingress cell arrives at the switch. The PI, VPI and VCI of the ingress cell are obtained and sent as input into the circuit 1 through the lines 16, 14 and 45 respectively. More specifically, the PI and the VPI are concatenated onto the line 12, and fed in as an address into the LUT 2. Each entry of the LUT 2 contains a 20-bit base-address of a page of the LUT 6, a 4-bit mask count whose purpose is described below, and a 2 bit connection type (CT) field whose purpose is also described below. The LUT 2 entries each being 32 bits wide, six bits in each entry are reserved for other uses that include the holding of control information associated with the PI/VPI combination, and the holding of further base-address bits in case the range of ECIs needs to grow in the future.

Inputting the PI/VPI combination results in the selection of an entry of the LUT 2. The base-address held inside the selected entry is forwarded through the line 20 and along the line 24 to the adder 5 where it will be used to generate an input address into the LUT 6. It is to be noted that though the 20-bit base-address generated by the LUT 2 can take on a value of up to $2^{20}$, its actual value is larger than the size of the LUT 6 which in this example holds only a maximum of $2^{17}$ pages. A 20-bit wide base-address means that the circuit 1 can be easily scaled to accept $2^{20}$ different PI/VPI combinations; it does not mean that the LUT 6 contains enough pages to map each of the $2^{20}$ PI/VPI combinations with an ICI. Thus, the base-address outputted by the LUT 2 will have a maximum value that is substantially more than the number of entries in the LUT 6.

The mask-count of the selected entry of the LUT 2 is forwarded through the line 20 and along the line 26 to the mask-count decoder 3. The behaviour of the mask-count decoder 3 is illustrated in FIG. 2. In the left-hand column of the table in FIG. 2, are the possible inputs into the decoder 3. These inputs are 4-bit mask-count values that range from 0 to 15. In the right hand column of the same table, are the 16-bit masks that are outputted by the mask-count decoder 3 when the corresponding mask-counts are supplied as inputs. FIG. 2 shows that the mask-count decoder 3 converts a binary mask-count, N, into a mask whose N least-significant bits are set high and whose remaining 16-N bits are set low. An exception to this observation occurs when N=0, in which case all the bits are set high.

The mask is generated to limit the allowable range of offset values that can be combined with a base-address when accessing the LUT 6. This is done to ensure that the number of VCIs that can be associated with each PI/VPI combination, and therefore with each page in the LUT 6, does not exceed a predetermined provisioned number for that PI/VPI combination. The limitation is achieved by feeding the VCI through the line 45, and the mask through the line 34 into the AND gate 4 in order to obtain each offset-address. For example, if a given PI/VPI combination is provisioned to support no more than eight VCIs numbered 0 to 7, a mask-count of "3" ("0011" in binary) would be held in the entry of the LUT 2 corresponding with the given PI/VPI combination. The mask-count would be sent though the line 26 to the mask-count decoder 3. Upon receipt of the mask-count, the mask-count decoder 3 would output a mask of '0000000000000111' as shown by FIG. 2, and the AND gate 4 would only be able to yield offset-addresses ranging from "000" to "111", which correspond to VCIs numbered 0 to 7.

It is to be noted that a PI/VPI combination will support a maximum number of $2^{16}$ VCIs, when the mask-count is set to '0', so that the mask output decoder 3 outputs '1111111111111111' as shown in FIG. 2.

As will be understood by those skilled in the art, it also is to be noted that if an attempt is made to read in an unsupported VCI value as an offset-address, the circuit 1 can be easily modified to additionally generate an error signal (modification not shown) in addition to filtering out the unsupported VCI value. This can be done, for example, by generating an error signal whenever the value of the offset-address is affected by the application of the mask to the VCI input.

Once the 16-bit off-set address and the 20-bit base-address have been calculated, both values are fed through lines 48 and 24 respectively into the adder 5. The adder 5 outputs a 17 bit value onto the line 54, the value being used as an address into the LUT 6.

The address fed into the LUT 6 references an entry containing a unique ICI. The entry of the LUT 6 also contains associated flags that describe aspects of the connection being referred to using the ICI. These flags are typically used by downstream components on the switch. The ICI and the flags are outputted from the circuit on the lines 62 and 64 respectively, for the benefit of components inside the switch.

Egress translation of the ICI to an egress ECI is effected whenever one of the associated connection's cells are scheduled for transmission from the switch. The egress translation function will involve accessing and processing information in a third LUT (not shown) according to known methods.

The preceding discussion assumes that the connection referenced by the external connection identifier is Virtual Channel (VC) switched. In fact, the connections associated with a PI/VPI combination can be additionally categorized as being invalid, or as being Virtual Path (VP) switched. The connection type is recorded in the above-mentioned CT field of each entry in the LUT 2. If the CT field indicates that the PI/VPI combination includes no valid connections, perhaps because it is not provisioned to receive service from the switch, then the information in the CT field can be distributed to other parts of the circuit 1 in order to ensure that no input address is submitted to the LUT 6. For example, the contents of the CT field can be fed through the lines 20, 28 into the output enable input 65 of the LUT 6 in order to prevent the generation of an ICI for invalid connections. An error signal (not shown) can also be generated, if an invalid PI/VPI combination is encountered.

Likewise, if the CT field indicates that any connection associated with the PI/VPI combination is VP switched, then the information in the CT field can be distributed to other parts of the circuit 1 in order to ensure that no offset-address is included in the input address submitted to the LUT 6. For example, the CT field-contents can be fed through the lines 20, 28 into the control input interface 40 of the mask-count decoder 3 so that the decoder 3 is able to generate only a mask comprising zero-bits when a VP-switched connection is being processed. This would result in a value of zero being inputted through the line 34 and into the AND gate 4, which in turn would result in an offset-address of zero, which in turn would limit the VP-switched connection to a single entry in the LUT 6.

It will be apparent to those skilled in the art that the embodiments described above can be easily adapted to accommodate a larger range of ICI values. More specifically, the circuit of FIG. 1 can be easily scaled to translate a larger subset of a potentially broad range of ECIs by simply increasing the width of the LUT 2 and the depth of the LUT 6. The logic 4, 5 involved in calculating the address of the LUT 6 would also have to be adjusted to accommodate the increased sizes of the LUTs 2, 6.

It also is to be noted that the range of ECIs that can be translated by the circuit 1 can be easily increased by increasing the depth of the LUT 2, without having to increase the number of ECI/ICI mappings supported by the circuit 1. This means that the number of entries in the LUT 6, or equivalently the number of ICIs supported on a switch, can remain at $2^{17}$ for example, no matter how broad the range of potentially translatable ECIs becomes. This is to be contrasted with some of the prior art translation methods, wherein increases in the range of accepted ECIs had to be accompanied by increases in the amount of memory required to hold ICIs.

The methods and apparatus described above thus represent a significant savings in memory costs. They can also keep the sizes of the ICIs relatively small which in turn reduces processing overhead, even if a long range of ECIs must be accommodated.

Furthermore, the above-described methods and apparatus do not use expensive large content addressable memories (CAMs).

It also will be apparent that the time required to translate each ECI into an ICI, is both short and deterministic.

Additionally, it will be noted that the above benefits are implemented using a design that is simple and robust.

Numerous modifications and variations of the present invention are possible in light of the above teachings. It is therefore to be understood that within the scope of the appended claims, the invention may be practised otherwise than as specifically described herein. For example, the sizes of the LUTs can be varied to accommodate different ranges of external identifiers, as well as different numbers of internal identifiers.

In another variant, the address on the line 54 that is inputted into the address input interface 56 of the LUT 6 forms the ICI. This is possible because the input address on the line 54 is itself a unique identifier that is smaller than the ECI. Under such a variant, only the control flags would have to be stored in the LUT 6 which means that fewer memory bits are required than in the embodiment illustrated in FIG. 1. This variant is also less flexible however, since its ICI output cannot take on the same range of forms as the ICI output of the embodiment illustrated in FIG. 1. For example, the least significant bits of the ICI output under this variant are necessarily the same as the corresponding bits of the inputted VCI.

In another variant, each mask count in the LUT 2, which is really an encoded mask, can be replaced by the entire corresponding decoded mask thus removing the need for the mask-count decoder 3. This would simplify the design of the circuit 1 at the expense of requiring more memory bits for the LUT 2.

In another variant, one or more pages of the LUT 6 can be designated to serve only VP-switched connections. This would allow each VP-switched connection to occupy a single entry in the designated page or pages of the LUT 6, as opposed to occupying an entire page. This variant can be implemented by placing the address of one of the designated LUT 6 pages into each LUT 2 entry that belongs to a VP-switched connection, and by then using the VPI of such connections to generate an offset-address within the designated LUT 6 pages.

The circuit 1 can also be easily modified to support a defragmentation process implemented in hardware, software, or a combination of hardware and software, to defragment the LUT 6. Fragmentation of the LUT 6 will tend to occur because of the changing sizes and locations of its pages 7 as external connections are established and released. The defragmentor operates by copying the pages 7 to new contiguous locations within the LUT 6 during time-slots when they are not being accessed. The defragmentor also updates the base-address, mask-count and CT contents of the LUT 2 once it has completed moving a page 7 to a new location within the LUT 6.

Figure 3:
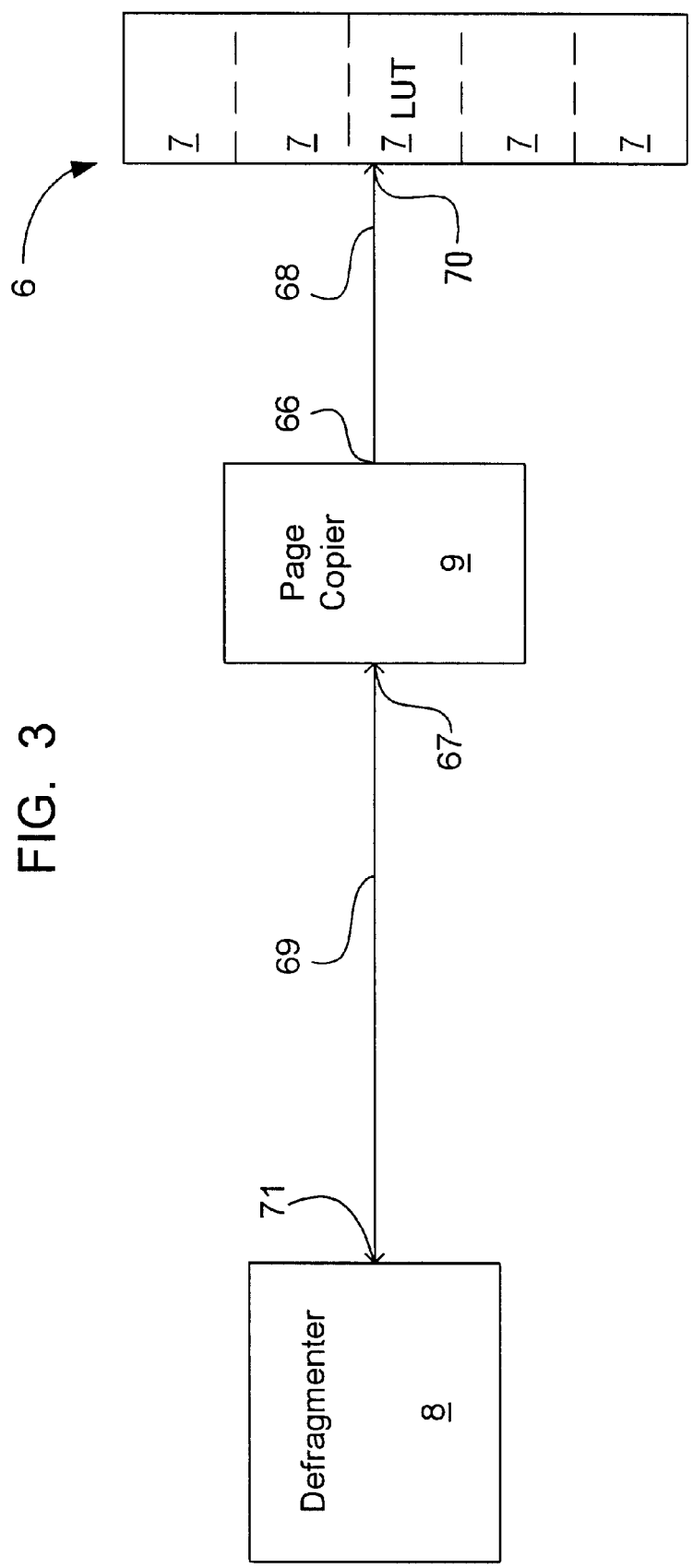
FIG. 3 is a block diagram of a defragmentor and a page-copier for defragmenting a look-up table (LUT) shown in FIG. 1.

The circuit 1 can be modified to assist a defragmentation process by additionally implementing a page-copy function. This function can be implemented using software, or as shown in FIG. 3, using hardware. FIG. 3 is a block-diagram of a conventional defragmentor 8 with an input/output interface 65 that is connected through a line 69 to an input/output interface 67 of a page-copier 9. An output interface 66 of the page-copier 9 is connected to an input interface 70 of the LUT 6 across a line 68. The page-copier 9 effects the relocation of pages 7 within the LUT 6 through the interface 70.

In a preferred embodiment, the page-copier 9 accepts from the defragmentor 8, through the line 69, a series of commands that each request that a page be moved within the LUT 6. The defragmentor 8 is thus free to make use of the page-copier 9 to defragment the LUT 6 according to several known algorithms. Each command is accompanied by a pointer to the present base-address of a page 7 to be moved, a pointer to the desired base-address of the page 7, and the length of the page 7. Once the page-copier 9 receives a command from the defragmentor 8, it gradually moves a page 7 as instructed, operating only during time-slots when no other process or circuit requires access to the LUT 6.

In a preferred embodiment the page-copier 9 can also be designed to supply control information through the input/output interface 67, the line 69, and the input/output interface 65, back to the defragmentor 8. The control information indicates the status of a page-copy operation that is in progress. These parameters are required because other systems, such as connection configuration controllers, will have priority over the page-copier 9 with respect to accessing the LUT 6. Therefore, it is important that the control bits can indicate whether or not the most recently initiated page-copy operation has been completed whenever a page-copy operation is interrupted by another system. This information can be used by the defragmentor 8 to decide whether or not it needs to restart the most recently initiated page-copy operation in light of the changes made to the LUT 6 since the operation was interrupted.

In a preferred embodiment, the page-copier 9 can provide the control information to the defragmentor 8, using a 2-bit control status signal. The first control bit can be set to "1" by the defragmentor 8 whenever it initiates a page-copy operation, and set to "0" whenever it has to interrupt a page-copy operation in order to allow some other system to access the page being copied. The second control bit can be set to "0" by the page-copier 9 when a page-copy operation is initiated, and set to "1" by the page-copier 9 when it has completed the most recently requested page-copy operation. This will allow the defragmentor 8 to learn of the status of the most-recently initiated page-copy operation. It will be noted that these two control bits can be read in tandem by any system in order to determine if the page-copier 9 is presently completing, has completed, or has been interrupted in trying to complete its most recently initiated page-copy operation.

The circuit 1 of FIG. 1 can also be simplified by implementing uniformly-sized pages in the LUT 6. Such a modification removes the need for the mask-field in each entry of the LUT 2, since the size of each page would be identical meaning that the mask-counts associated with each entry would be identical. The use of uniformly-sized pages also removes the need to defragment the LUT 6 as well as the need for the mask-count decoder 3. Furthermore, the use of uniformly-size pages need not result in an increased probability of pages being overwritten with data belonging to more than one PI/VPI combination. Under such an embodiment for example, attempts to use offset-addresses that exceed the size of each page can result in the generation of error signals.

This variant offers less flexibility however, for configuring connections associated with PI/VPI combinations. The use of uniformly-sized pages also results in an increasingly sub-optimal utilization of the LUT 6, as the difference between the number of VCIs per PI/VPI combination and the number of entries per page increases.

It will be apparent to those skilled in the art that the translation circuit 1 can be applied to a variety of other telecommunication switches besides ATM switches. The above-described methods and apparatus are applicable to any telecommunications switch that has to receive relatively bulky ECIs formatted according to a network-wide protocol from other nodes, but that uses relatively small and manageable ICIs to distinguish traffic belonging to different connections or flows for internal processing purposes.

Moreover, it will be obvious to those skilled in the art that this invention can be implemented on platforms other than telecommunications switches, and in fields falling outside telecommunications engineering altogether. A variety of applications exist wherein large identifiers require translating into smaller identifiers for processing purposes.

For example, software subsystems within any database-system that handles a wide range of large-identifiers can use this invention. More specifically, subsystems that have to be able to manipulate a wide range of large identifiers such as the numbers placed on but that in fact are always handling a small subset of that large range such as the bank-branch numbers alone, could use this invention to generate smaller and more manageable identifiers for their own internal use.

Other applications can be found that are too numerous to mention.

Finally, it will be obvious to those skilled in the art that the invention can be implemented using a variety of technologies. It can be implemented using hardware configurations besides the one shown in FIG. 1, using software, and using numerous possible combinations of hardware, software and firmware, for example.

We claim:

1. A method of translating any of a full range of external identifiers into an internal identifier, the method comprising:
   providing a final look-up table (LUT) that has an internal identifier in each of its entries, that is divided into a plurality of pages, and that allows access to a given entry upon receiving a base-address that specifies the page of the entry and an offset-address that specifies the position of the entry within the page;
   providing an initial look-up table (LUT) that has in each of its entries a base-address of a page of the final LUT;
   dividing an inputted external identifier into a plurality of fields;
   inputting the contents of a subset of the plurality of fields, the subset being associated with the internal identifiers inside a specific page of the final LUT, as a given address into the initial look-up table to obtain the base-address of the specific page;
   determining an offset address from the contents of the field or fields of the external identifier not sent into the initial LUT, the offset address being limited to a respective value for each base address;
   adding the base-address of the specific page obtained from the inputting step to the offset-address to obtain a resulting sum, and using the resulting sum as an address into the final LUT; and
   reading the entry of the final LUT referenced by the resulting sum to obtain the internal identifier, the internal identifier having a range which is smaller than the full range of the external identifiers.

2. The method of claim 1 wherein the sizes of the pages are uniform.

3. The method of claim 2 wherein an attempt to use an offset-address that exceeds the number of entries comprising each page results in the generation of an error signal.

4. The method of claim 1 wherein the sizes of the final LUT pages are each variable, and wherein the offset-address is calculated by pushing the contents of the field or fields of the external identifier not sent into the initial LUT through a mask, the mask being associated with the given address used to access the initial LUT and being set so that the resulting sum can only reference an entry of the final LUT that belongs to the specific page.

5. The method of claim 4 wherein the mask is held in an additional field of the initial LUT entry referenced by the given address.

6. The method of claim 4 wherein an encoded form of the mask is held in an additional field of the initial LUT entry referenced by the given address.

7. A method of translating any of a full range of external identifiers into a smaller internal identifier, the method making use of:
   a final look-up table (LUT) that has an internal identifier in each of its entries, that is divided into a plurality of pages, and that allows access to a given entry upon receiving a base-address that specifies the page of the entry and an offset-address that specifies the position of the entry within the page, said method comprising the steps of;
   dividing an inputted external identifier into a plurality of fields;
   inputting the contents of a subset of the plurality of fields, the subset being associated with the internal identifiers inside a specific page of the final LUT, as a given address into an initial look-up table (LUT) that has in each of its entries a base-address of a page of the final LUT, to obtain the base-address of the specific page;
   adding the base-address of the specific page obtained from the inputting step to an offset-address, which is obtained from the contents of the field or fields of the external identifier not sent into the initial LUT, to obtain a resulting sum, and using the resulting sum as an address into the final LUT; and
   reading the entry of the final LUT referenced by the resulting sum to obtain the smaller internal identifier;
   wherein the sizes of the final LUT pages are each variable, and wherein the offset-address is calculated by pushing the contents of the field or fields of the external identifier not sent into the initial LUT through a mask, the mask being associated with the given address used to access the initial LUT and being set so that the resulting sum can only reference an entry of the final LUT that belongs to the specific page;

wherein an encoded form of the mask is held in an additional field of the initial LUT entry referenced by the given address; and wherein the encoded form of the mask is a binary mask-count, N, that indicates a maximum number of entries that can be included in the specific page, wherein the N least-significant bits of the mask are set high and the remaining bits of the mask are set low, except when N is equal to zero in which case all the bits of the mask are set high, and wherein the step of pushing the contents of the field or fields of the external identifier not sent into the initial LUT through the mask, comprises the step of logically ANDing each bit of the mask with each bit of the field or fields of the external identifier not sent into the initial LUT.

8. The method of claim 4 wherein the method includes the additional step of generating an error signal whenever the value of the offset-address is affected by the application of the mask to the contents of the field or fields of the external identifier not sent into the initial LUT.

9. A method of translating any of a full range of external identifiers into a smaller internal identifier, the method making use of:

a final look-up table (LUT) that has an internal identifier in each of its entries, that is divided into a plurality of pages, and that allows access to a given entry upon receiving a base-address that specifies the page of the entry and an offset-address that specifies the position of the entry within the page, said method comprising the steps of;

dividing an inputted external identifier into a plurality of fields;

inputting the contents of a subset of the plurality of fields, the subset being associated with the internal identifiers inside a specific page of the final LUT, as a given address into an initial look-up table (LUT) that has in each of its entries a base-address of a page of the final LUT, to obtain the base-address of the specific page;

adding the base-address of the specific page obtained from the inputting step to an offset-address, which is obtained from the contents of the field or fields of the external identifier not sent into the initial LUT, to obtain a resulting sum, and using the resulting sum as an address into the final LUT; and reading the entry of the final LUT referenced by the resulting sum to obtain the smaller internal identifier;

wherein the sizes of the final LUT pages are each variable, and wherein the offset-address is calculated by pushing the contents of the field or fields of the external identifier not sent into the initial LUT through a mask, the mask being associated with the given address used to access the initial LUT and being set so that the resulting sum can only reference an entry of the final LUT that belongs to the specific page;

wherein the final LUT is additionally being defragmented by copying its pages to new contiguous locations during time-slots when the final LUT is not being accessed, and wherein the entries of the initial LUT are updated to reflect the changes effected on the final LUT once a page has been moved.

10. The method of claim 9 wherein the status of a page-copy operation that is in progress is tracked so as to indicate whether the most recently initiated page-copy operation has been completed, is being completed or has been interrupted.

11. The method of claim 1 as applied to a telecommunications switch, wherein the external identifiers are external connection identifiers (ECIs) that are used to distinguish traffic belonging to different connections, and wherein the internal identifiers are internal connection identifiers (ICIs) that are mapped to the ECIs being supported by the switch.

12. The method of claim 11 wherein the telecommunications switch is an Asynchronous Transfer Mode (ATM) switch.

13. The method of claim 12 wherein each external connection identifier comprises a Virtual Path Identifier (VPI) and a Virtual Channel Identifier (VCI) and wherein the subset of the plurality of fields whose contents are used as an address into the initial LUT comprises the VPI field.

14. The method of claim 12 wherein each external connection identifier comprises a Virtual Path Identifier (VPI), a Virtual Channel Identifier (VCI), and a Port Identifier (PI), and wherein the subset of the plurality of fields whose contents are used as an address into the initial LUT comprises the PI and VPI fields.

15. The method of claim 14 wherein each of the entries of the initial LUT additionally includes a connection type (CT) field that indicates whether the associated PI and VPI correspond with connections that are virtual circuit (VC) switched, virtual path (VP) switched or invalid, the CT field being used to facilitate the differential processing of said types of connections.

16. A method of translating any of a full range of external identifiers into a smaller internal identifier, the method making use of:

a final look-up table (LUT) that has an internal identifier in each of its entries, that is divided into a plurality of pages, and that allows access to a given entry upon receiving a base-address that specifies the page of the entry and an offset-address that specifies the position of the entry within the page, said method comprising the steps of;

dividing an inputted external identifier into a plurality of fields;

inputting the contents of a subset of the plurality of fields, the subset being associated with the internal identifiers inside a specific page of the final LUT, as a given address into an initial look-up table (LUT) that has in each of its entries a base-address of a page of the final LUT, to obtain the base-address of the specific page;

adding the base-address of the specific page obtained from the inputting step to an offset-address, which is obtained from the contents of the field or fields of the external identifier not sent into the initial LUT, to obtain a resulting sum, and using the resulting sum as an address into the final LUT; and reading the entry of the final LUT referenced by the resulting sum to obtain the smaller internal identifier;

as applied to a telecommunications switch, wherein the external identifiers are external connection identifiers (ECIs) that are used to distinguish traffic belonging to different connections, and wherein the internal identifiers are internal connection identifiers (ICIs) that are mapped to the ECIs being supported by the switch;

wherein the telecommunications switch is an Asynchronous Transfer Mode (ATM) switch;

wherein each external connection identifier comprises a Virtual Path Identifier (VPI), a Virtual Channel Identifier (VCI), and a Port Identifier (PI), and wherein the subset of the plurality of fields whose contents are used as an address into the initial LUT comprises the PI and VPI fields;

wherein each of the entries of the initial LUT additionally includes a connection type (CT) field that indicates whether the associated PI and VPI correspond with connections that are virtual circuit (VC) switched, virtual path (VP) switched or invalid, the CT field being used to facilitate the differential processing of said types of connections; and wherein the offset-address is set to zero if the connection is VP switched.

17. The medthod of claim 15 wherein the resulting sum is not used as an address into the final LUT, no ICI is generated as output, and an error-signal is generated, if the connection is invalid.

18. An apparatus for translating any of a full range of external identifiers, each of which is defined by a plurality of fields, into an internal identifier, comprising:

a final look-up table (LUT) which is divided into a plurality of pages, each page having one entry or many entries and each entry containing an internal identifier, which receives an address input that comprises a base-address specifying a specific page and an offset-address specifying a specific entry within the specific page, and which yields an output that includes the internal identifier stored inside the specific entry, the internal identifier having a range which is smaller than the full range of external identifiers;

an initial look-up table (LUT) which has a plurality of entries, each entry containing a respective base-address of a page of the final LUT, which receives an address input comprising a subset of the fields of the external identifier, said address input being associated with the internal identifiers inside a specific page of the final LUT, and which yields an output that includes a specific base-address found in the entry referenced by the address input; and an adder, which receives a first input comprising the specific base-address yielded as output by the initial LUT, which receives a second input comprising an offset-address obtained from the field or fields of the external identifier that were not used as addressing inputs into the initial LUT, and which yields as an output the address input into the final LUT.

19. The apparatus of claim 18 wherein the pages have uniform sizes.

20. The apparatus of claim 19 wherein the apparatus has means for generating an error signal if the adder makes use of an offset-address that exceeds the number of entries comprising each page.

21. An apparatus for translating any of a full range of external identifiers, each of which is defined by a plurality of fields, into an internal identifier, comprising:

a final look-up table (LUT) which is divided into a plurality of pages, each page having one entry or many entries and each entry containing an internal identifier, which receives an address input that comprises a base-address specifying a specific page and an offset-address specifying a specific entry within the specific page, and which yields an output that includes the internal identifier stored inside the specific entry, the internal identifier having a range which is smaller than the full range of external identifiers;

an initial look-up table (LUT) which has a plurality of entries, each entry containing a respective base-address of a page of the final LUT, which receives an address input comprising a subset of the fields of the external identifier, said address input being associated with the internal identifiers inside a specific page of the final LUT, and which yields an output that includes a specific base-address found in the entry referenced by the address input;

an adder, which receives a first input comprising the specific base-address yielded as output by the initial LUT, which receives a second input comprising an offset-address obtained from the field or fields of the external identifier that were not used as addressing inputs into the initial LUT, and which yields as an output the address input into the final LUT;

wherein:

the pages are variably sized;

the initial LUT additionally has in each of its entries a mask that limits the maximum number of entries that can comprise the specific page;

the apparatus additionally comprises logic which receives a first input comprising the mask, which receives a second input comprising the field or fields of the external identifier that were not used as addressing inputs into the initial LUT, and which yields as an output the offset-address; and the second input received by the adder comprises the output of the logic.

22. The apparatus of claim 21 the wherein the mask in each of the entries in the initial LUT is stored in an encoded form and wherein the apparatus additionally includes a mask decoder, which receives as input the part of the output of the initial LUT that specifies the encoded mask, and which yields as output the mask.

23. The apparatus of claim 22 wherein the encoded form of the mask is a mask-count, the mask decoder is a mask-count decoder that has means for converting a binary mask-count, N, into a mask whose N least-significant bits are set high and whose remaining 16-N bits are set low, except when N is equal to zero in which case all the bits are set high, and wherein the logic is implemented as a bank of AND gates that takes the output of the mask-count decoder as one input, and the contents of the field or fields comprising the external identifier that were not used as addressing inputs into the initial LUT as another input.

24. The apparatus of claim 21 wherein a page-copier is additionally connected to the final LUT, said page-copier being used for copying pages to new contiguous locations within the final LUT during time-slots when the final LUT is not being accessed, and wherein a defragmentor is connected to the page-copier, said defragmentor being used for controlling the page-copier so as to effect defragmentation of the final LUT and for updating the entries of the initial LUT to reflect the changes effected on the final LUT once a page has been moved.

25. The apparatus of claim 24 wherein the page-copier has means for tracking the status of a page-copy operation that is in progress so as to indicate whether the most recently initiated page-copy operation has been completed, is being completed or has been interrupted.

26. The apparatus of claim 22 as deployed in a telecommunications switch, wherein the external identifiers are external connection identifiers (ECIs) that are used to distinguish between traffic belonging to different connections or flows, and wherein the internal identifiers are internal connection identifiers (ICIs).

27. The apparatus of claim 26 wherein the telecommunications switch is an Asynchronous Transfer Mode (ATM) switch.

28. The apparatus of claim 27 wherein each external connection identifier comprises a Virtual Path Identifier (VPI) and a Virtual Channel Identifier (VCI) and wherein the subset of the plurality of fields whose contents are used as an address into the initial LUT comprises the VPI field.

29. The apparatus of claim 27 wherein each external connection identifier comprises a Virtual Path Identifier (VPI), a Virtual Channel Identifier (VCI), and a Port Identifier (PI), and wherein the subset of the plurality of fields whose contents are used as an address into the initial LUT comprises the PI and VPI fields.

30. The apparatus of claim 29 wherein each of the entries of the initial LUT additionally includes a connection type (CT) field that indicates whether the associated connection is virtual circuit (VC) switched, virtual path (VP) switched or invalid, wherein the mask decoder receives a second input comprising the contents of the CT field, and wherein the final LUT receives an additional input comprising the contents of the CT field.

31. The apparatus of claim 18 wherein the initial LUT is a 64K×32-bit memory.

32. An apparatus for translating any of a full range of external identifiers, each of which is defined by a plurality of fields, into an internal identifier, comprising:

a final look-up table (LUT) which is divided into a plurality of pages, each page having one entry or many entries and each entry containing an internal identifier, which receives an address input that comprises a base-address specifying a specific page and an offset-address specifying a specific entry within the specific page, and which yields an output that includes the internal identifier stored inside the specific entry, the internal identifier having a range which is smaller than the full range of external identifiers;

an initial look-up table (LUT) which has a plurality of entries, each entry containing a respective base-address of a page of the final LUT, which receives an address input comprising a subset of the fields of the external identifier, said address input being associated with the internal identifiers inside a specific page of the final LUT, and which yields an output that includes a specific base-address found in the entry referenced by the address input;

an adder, which receives a first input comprising the specific base-address yielded as output by the initial LUT, which receives a second input comprising an offset-address obtained from the field or fields of the external identifier that were not used as addressing inputs into the initial LUT, and which yields as an output the address input into the final LUT; and wherein the final LUT is a 128K×32-bit memory.

33. The apparatus of claim 18 as deployed in a telecommunications switch, wherein the external identifiers are external connection identifiers (ECIs) that are used to distinguish between traffic belonging to different connections or flows, and wherein the internal identifiers are internal connection identifiers (ICIs).

34. The apparatus of claim 33 wherein the telecommunications switch is an Asynchronous Transfer Mode (ATM) switch, and wherein the external connection identifier includes a Virtual Path Identifier (VPI) and a Virtual Channel Identifier (VCI).

35. The apparatus of claim 34 wherein each of the entries of the initial LUT additionally includes a connection type (CT) field that indicates whether the associated connection is virtual circuit (VC) switched, virtual path (VP) switched or invalid, and wherein the final LUT receives an additional input comprising the contents of the CT field.

* * * * *